(No Model.) 5 Sheets—Sheet 1.

J. MACKSEY & W. HELMER.
APPARATUS FOR AND PROCESS OF MAKING CARBONATED BEVERAGES.

No. 511,903. Patented Jan. 2, 1894.

(No Model.) 5 Sheets—Sheet 4.

J. MACKSEY & W. HELMER.
APPARATUS FOR AND PROCESS OF MAKING CARBONATED BEVERAGES.

No. 511,903. Patented Jan. 2, 1894.

WITNESSES.
Henry Marsh.
Harry H. Aiken.

INVENTORS.
John Macksey
William Helmer
by Tychemacher
Atty

UNITED STATES PATENT OFFICE.

JOHN MACKSEY AND WILLIAM HELMER, OF BOSTON, MASSACHUSETTS, ASSIGNORS TO THE AMERICAN SODA-FOUNTAIN COMPANY, OF SAME PLACE.

APPARATUS FOR AND PROCESS OF MAKING CARBONATED BEVERAGES.

SPECIFICATION forming part of Letters Patent No. 511,903, dated January 2, 1894.

Application filed February 10, 1893. Serial No. 461,796. (No model.)

*To all whom it may concern:*

Be it known that we, JOHN MACKSEY and WILLIAM HELMER, citizens of the United States, residing at Boston, in the county of Suffolk and State of Massachusetts, have invented certain Improvements in Apparatus for and Processes of Making Carbonated Beverages, of which the following is a full, clear, and exact description, reference being had to the accompanying drawings, making part of this specification, in which—

Our invention relates to a simple apparatus in which carbonic-acid gas is taken from a generator or liquid gas flask, and water or other liquid from any suitable source of supply and thoroughly combined to produce soda-water without the employment of an agitator or a combined gas and liquid pump; and our invention has for its object to improve the construction of apparatus for making carbonated beverages, whereby the water or other liquid is caused to absorb a greater quantity of gas, and in a shorter period of time than has heretofore been found possible with machines of this character as hitherto constructed.

To this end our invention consists in an apparatus embodying a pump for pumping liquid only, mixing vessels or chambers, in which the liquid is thoroughly impregnated or saturated with the gas, and suitable valves, gages, and pipes constructed and arranged to cause, govern, and indicate the operation of the apparatus, as hereinafter fully described; and our invention further consists in certain novel combination of parts and details of construction as hereinafter fully described and specifically pointed out in the claims.

In the said drawings, A represents the base of the machine to which are bolted the upright standards B, B', forming the framework, to the front of which is secured the cylinder of a double acting suction and force pump C, the piston rod $a$ of which is connected by a connecting rod $b$ with a crank $c$ on a driving shaft D which is supported in suitable bearings at the tops of the standards B, B', said shaft D carrying a fly wheel E and fast and loose pulleys G, H, over which passes a belt, (not shown) by which motion is transmitted in the usual manner.

I, K, are two mixing-cylinders or vessels supported on the base A and capable of sustaining heavy pressure, said cylinders being supplied with carbonic acid gas and with water or other liquid, through separate pipes to be presently described.

Figure 1:
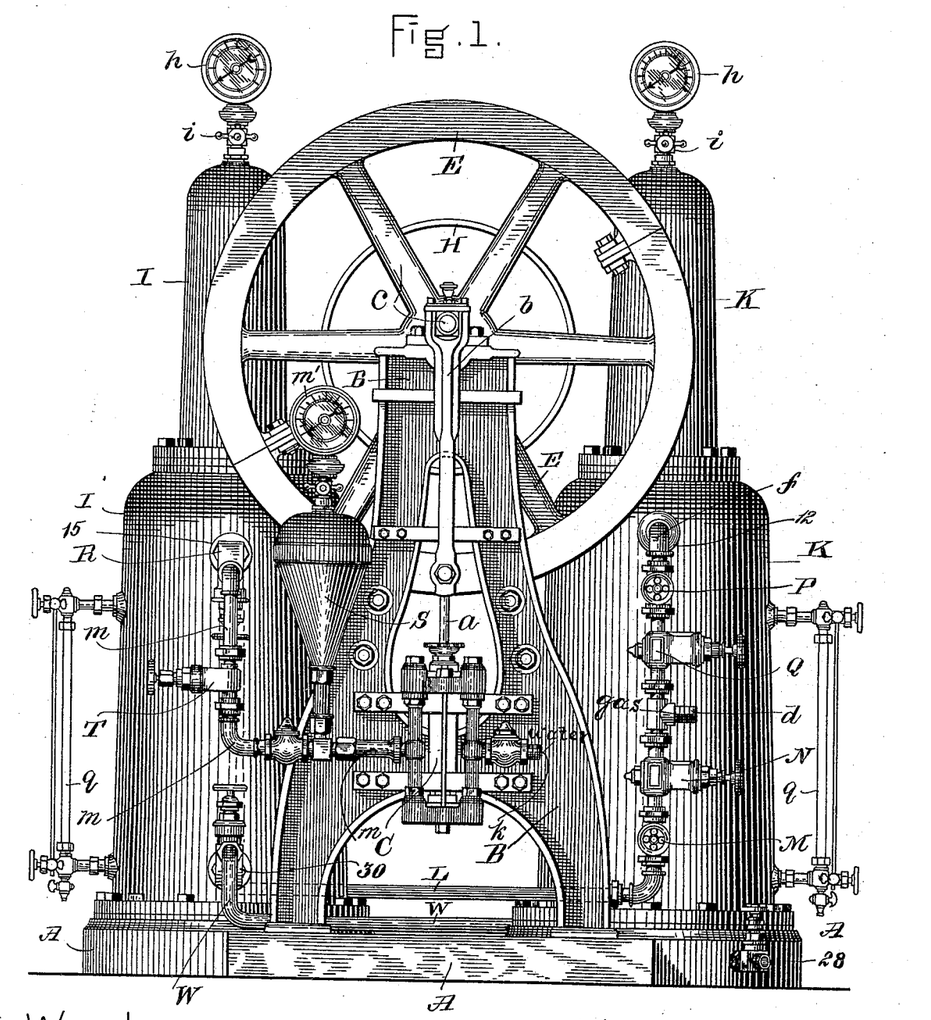
Figure 1 is a front elevation of our improved apparatus for making carbonated beverages.
Figure 3:
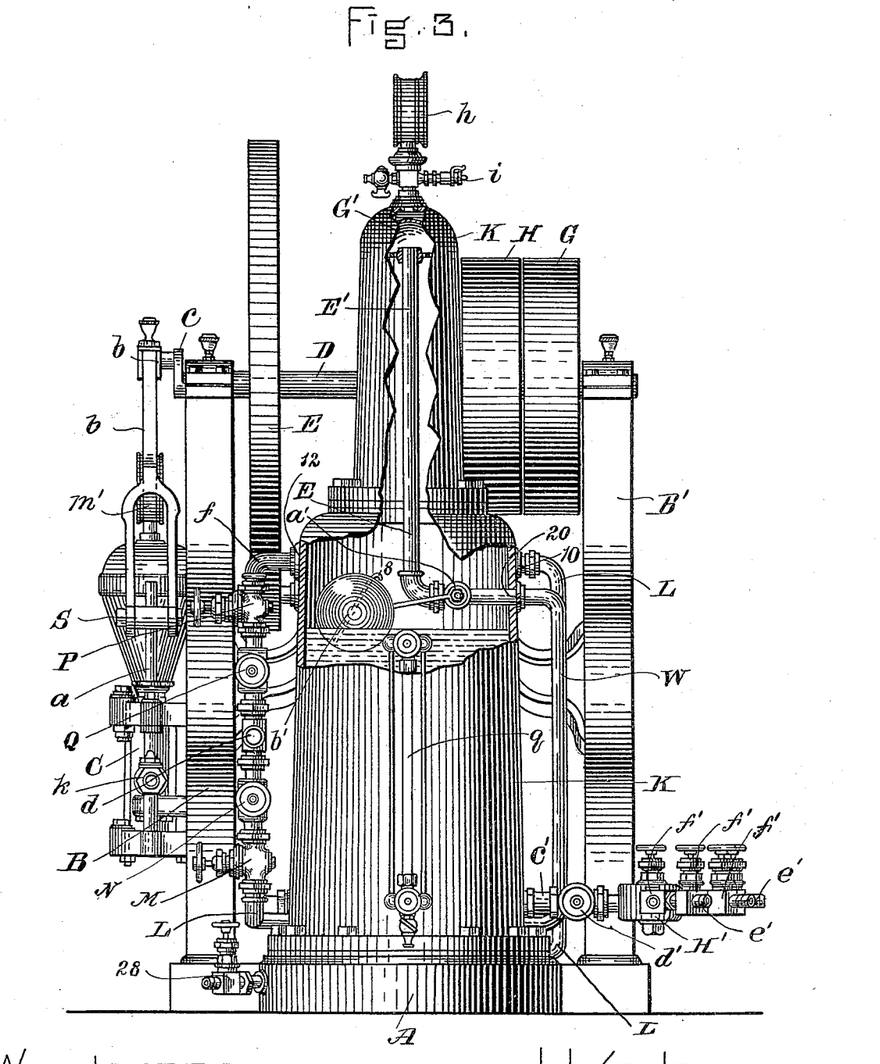
Fig. 3 is an elevation of the opposite side of the same with a portion of the other mixing-cylinder broken away to show the interior construction.

The carbonic-acid gas, at a higher pressure than that required in the finished soda-water, is taken from the generator or other source of supply and conducted by a pipe, (not shown) which is attached to the apparatus at the gas-inlet $d$, Figs. 1 and 3, passing thence by a pipe L to the primary mixing-cylinder I, with which said pipe is connected on the rear side at 10. Below the gas-inlet $d$ is a valve M by which the gas is admitted to or shut off from the pipe L, and between the valve M and the gas-inlet $d$ is an automatic regulating valve N of any suitable or approved construction, which will open when the pressure in the cylinder I falls below the desired point and will maintain an unvarying pressure in the cylinder after being properly adjusted. Therefore it will be understood that by the term "regulating valve" as hereinafter used in the specification and claims we mean a valve which will be governed in its opening and closing by the variations in pressure in the mixing vessel, opening when said pressure is lower than that at which said valve is set, and closing when said pressure is as high as that at which said valve is set; the said valve being so constructed that it is normally closed and cannot be opened by the high pressure at which gas is supplied until the low pressure in the mixing vessel falls below the point at which the said valve is set. Above the gas-inlet, and communicating therewith is another pipe *f* connected with the secondary mixing cylinder K on the front side at 12, and provided with a shut-off valve P similar to the valve M, and also between said valve P and the gas-inlet *d*, with an automatic regulating valve Q similar to the valve N above referred to.

Each of the mixing cylinders I, K, is provided with a pressure gage *h* to indicate the gas pressure within the same, and also with a safety or air valve *i*, which can be set to blow off at any predetermined pressure.

Pure water or other liquid is supplied from a tank or other source of supply by means of a suction pipe (not shown) connected with the water-inlet *k*, through which the liquid is drawn into the cylinder of the pump C by the action of its piston, being discharged through a pipe *m* connected with the primary mixing cylinder I at 15, near which point said pipe is provided with an inlet valve R. The pump C is provided with an air chamber S connected with the pipe *m*, which latter is provided between the air chamber S and the valve R with a relief valve T of any suitable or approved construction, with which is connected a pipe *p*, Fig. 2, through which the liquid escaping when the relief valve opens, is returned to the tank from which it was drawn by the pump and waste thus avoided. Each of the cylinders I, K, is provided with a glass water gage *q* for indicating the level of the liquid therein, and also at its bottom with a blow-off cock 28 to facilitate the operation of cleansing, and at the top of the air chamber S is a pressure gage *m'*.

W is a pipe leading from the bottom of the primary cylinder I to the secondary cylinder K with which it is connected at 20, the liquid after being partially impregnated with gas in the cylinder I, being forced by the gas pressure in said cylinder through the pipe W into the secondary cylinder K, where the carbonating process is completed as hereinafter fully described, said pipe W being provided close to the cylinder I with a shut off valve 30.

Figure 2:
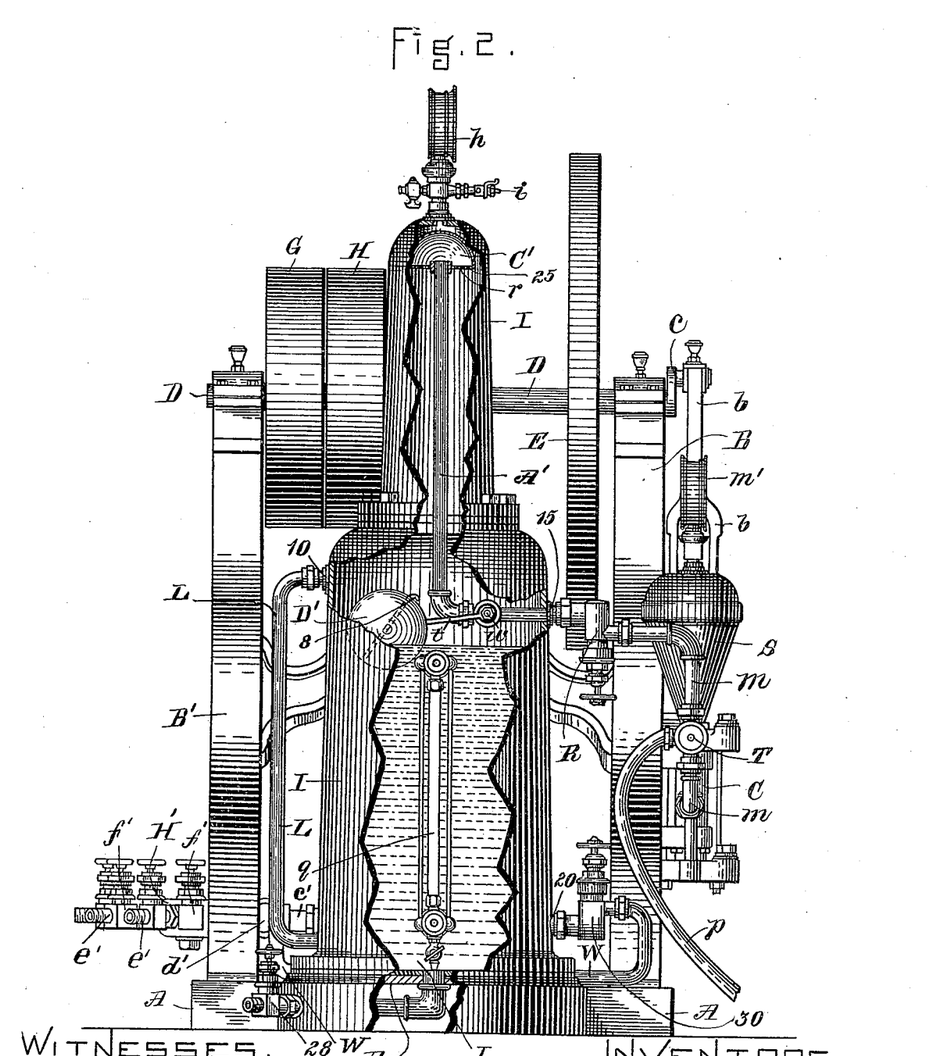
Fig. 2 is an elevation of one side of the same, with a portion of one of the mixing-cylinders broken away to show the parts within.

Within the cylinder I is placed a vertical tube or stand-pipe A' which is connected with the inlet pipe *m* at the valve R and extends up nearly to the top of the dome or upper portion of the cylinder, terminating in a sprayhead or device consisting preferably of a chamber C' of hemispherical form, the convex or upper side conforming to the shape of the dome, as shown in Fig. 2, while the flat lower side *r*, which is screwed onto the end of the pipe A', is provided with a series of small jet holes 25, through which the liquid is discharged, falling in a fine spray or shower to the bottom of of the cylinder I, and through the gas under pressure with which said cylinder is charged, becoming thereby mixed and impregnated with the same as required. As soon as the partially carbonated water reaches the desired level in the cylinder I, a floating ball D' is raised thereby, said ball being connected by an arm or lever *t* with a valve *w* in the lower horizontal portion of the pipe A', which valve is thereby closed, shutting off the water supplied by the pump C. If preferred a perforated diaphragm may be extended across the upper portion of the cylinder I by flanging the dome near its top, as a substitute for the hemispherical spray-head above described, which construction may be adopted for convenience of access in cleaning, but any other suitable spraying device may be employed if desired.

Figures 5, 6, 7:
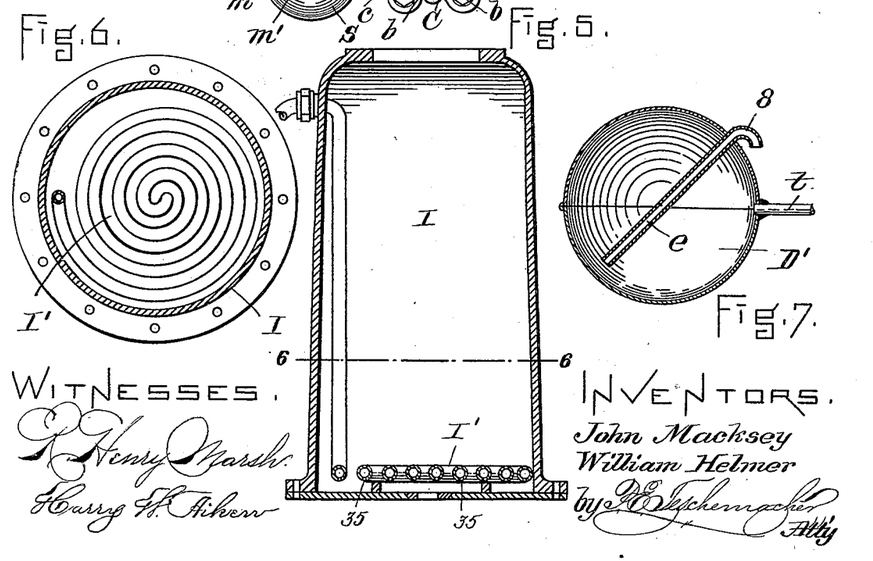
Fig. 5 is a vertical section of one of the mixing cylinders illustrating a modification of our invention.
Fig. 6 is a horizontal section on the line 6, 6, of Fig. 5.
Fig. 7 is an enlarged section through the hollow ball of one of the float-valves illustrating the device whereby it is prevented from being burst or collapsed by the pressure of gas from within or without.

As the ball of the float-valve is usually constructed of sheet metal, it would be liable to collapse by any great pressure exerted upon its exterior by the liquid or gas in the mixing cylinder within which it is placed, while the most minute leak conceivable will admit gas to the interior of the ball, which when the pressure in the said mixing cylinder is reduced, will burst the ball from within. A hole made in the ball for the purpose of allowing the gas under pressure to freely enter and escape would prevent the bursting or collapse of the ball, but wherever said hole was located, it would occasionally admit a drop of water, and this water having no means of exit, would eventually accumulate in such quantity as to materially lessen the buoyancy of the ball and interfere with its action as a float. To overcome these difficulties and accomplish the desired result, a hole is made in any convenient part of the top of the ball, within which is inserted, with a tight joint, a small tube *e*, as shown in Fig. 7, which is open at both ends and extends down to near the bottom of the ball. The upper end of the tube *e* outside the ball is crooked or bent over as shown at 8 so as to point downward, whereby the liquid as it falls within the mixing-cylinder from the spraying device is prevented from entering the ball through the said tube *e*. Even with this precaution, more or less liquid will be carried into the hollow ball with the gas when the pressure is increasing in the mixing-cylinder, from the admission of either gas from the generator or other source of supply, or water from the pump, and it therefore becomes necessary to provide a means for preventing any accumulation of liquid within the ball which would increase its weight so that it would no longer act as a float. This is accomplished by extending the tube *e* into the bottom portion of the ball as above described, so that its lower end will be immersed in the liquid as soon as it accumulates to any appreciable degree, and when so immersed it will be obvious that whenever the pressure in the mixing cylinder is reduced by draft to the bottling table or otherwise, the gas in the ball will expand, and in escaping will exert a pressure on the liquid in said ball and force it out through the tube $e$, after which the pressure of the gas on the inside and outside of the ball will be equalized, and all danger of injury to the apparatus, or interference with its proper operation will thus be avoided.

The secondary mixing cylinder K is provided with a stand pipe E' and spray head G' similar to those of the cylinder I, the pipe E' being connected with the inlet pipe W through which the partially carbonated liquid is forced by the pressure of the gas in the cylinder I to be again sprayed and completely saturated with gas in the cylinder K. The lower horizontal portion of the stand-pipe E' is also provided with a valve $a'$ controlled by a floating ball $b'$ connected therewith and of similar construction to that D' in the cylinder I above described.

Figure 4:
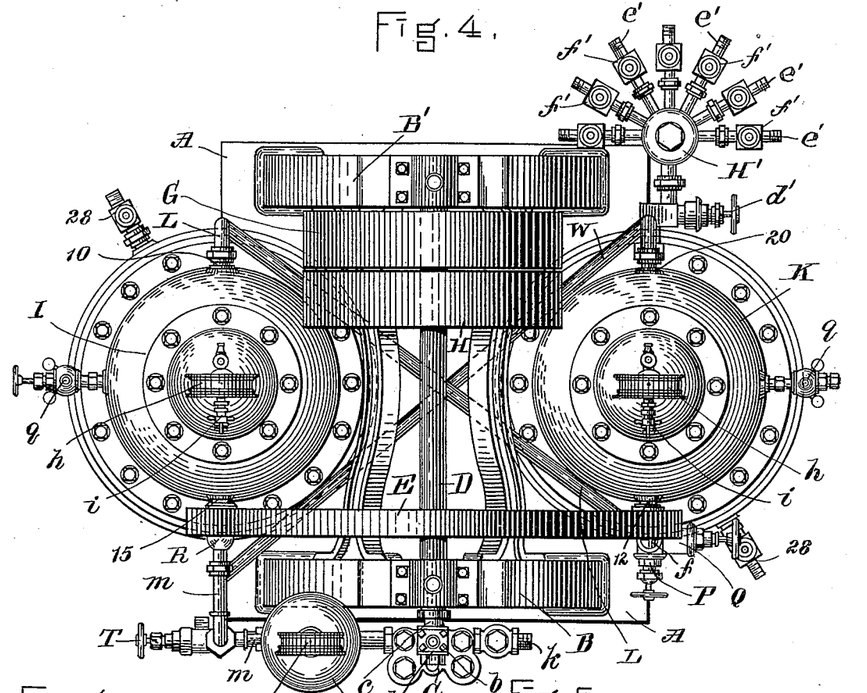
Fig. 4 is a plan view of the apparatus.

The device for distributing the finished carbonated liquid to the bottling tables consists of a small cylindrical vessel or chamber H' connected with the cylinder K by a short pipe $c'$, Fig. 3, provided with a shut off valve $d'$. The chamber H' is provided around its periphery with a series of radial distributing pipes $e'$ extending out horizontally as shown in Fig. 4, each of said pipes having a valve $f'$ to control the supply of carbonated liquid to the bottling table with which it is connected. By means of this device the supply of liquid and gas to each pipe $e'$ is rendered uniform so that each bottling table will receive an equal supply of gas and liquid.

In Figs. 5 and 6 is represented a modification of our invention in which the inlet pipe which supplies gas to the mixing-cylinder I or K is extended downward on the inside to near the bottom of the same where it terminates in a coil I' provided on its under surface with numerous small holes 35, through which the gas is discharged into the liquid contained in the cylinder, rising therethrough and being thereby partially absorbed by the liquid, additional mixing facilities being thus afforded. By placing these holes 35 in the under side of the coil instead of on its upper side, the liability of their becoming clogged or obstructed by the deposition of dirt and sediment contained in the water is materially lessened, which is an important advantage.

In apparatus where the mixing cylinders are of small diameter, it will be obvious that some modification of the float-valve will become necessary as there will not be sufficient space to admit of the employment of the construction shown in Figs. 2 and 3. We therefore employ in such case a float-valve of the construction shown in Fig. 8, in which K' represents the valve casing, $h'$ the inlet, adapted to be connected with the pipe leading from the pump C, and $i'$ the outlet adapted to be connected with the stand-pipe and spraying device within the mixing-cylinder.

Figure 8:
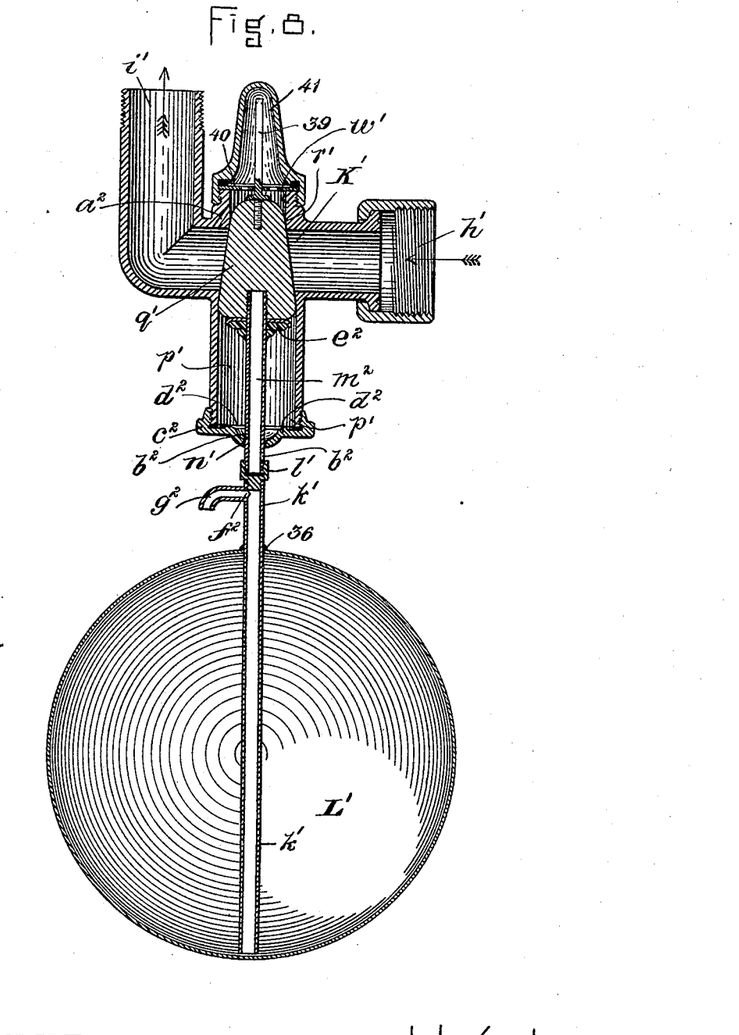
Fig. 8 is an enlarged section through a float-valve of modified construction to adapt it for use with a mixing-cylinder of small diameter.

L' is the hollow float-ball to which is secured at 36 a vertical stem $k'$ consisting of a hollow tube open at its lower end and extending down into the bottom part of the ball L'. The upper end of the tube $k'$ is closed by a screw coupling plug $l'$, into the top of which is screwed a tubular spindle $m^2$ which forms an extension or prolongation of the tube $k'$ connected therewith by said coupling plug $l'$.

The spindle $m^2$ passes up through an opening $n'$ into a cylindrical chamber $p'$ forming the bottom of the valve-casing, said spindle $m^2$ sliding freely in said opening $n'$.

To the upper end of the tubular spindle $m^2$ is secured the conical valve-plug $q'$ which is adapted to move vertically within the chamber $p'$, and when raised by the upward movement of the float-ball, caused by the rise of the liquid in the mixing-cylinder, will be forced tightly up into a tapering valve seat $r'$ formed in the upper portion of the valve casing, thus closing the valve and shutting off the supply of liquid to the stand-pipe connected therewith. The valve $q'$ is guided and steadied in its movements by a spindle 39 projecting from its upper end and passing through a perforated plate 40 held in place by a suitably shaped cap 41 screwed over a nipple $w'$ formed on the upper portion of the valve casing and upon which the plate 40 rests.

In order that the liquid, which will partially or entirely fill the cap 41, and its nipple $w'$, may not obstruct or resist the valve in closing, a vent hole $a^2$ is drilled from the inner part of the nipple $w'$ into the outlet passage of the casing, through which the liquid displaced by the valve as it rises into its seat, will be expelled.

Whenever the level in the liquid in the cylinder or vessel in which the float-valve is placed, is lowered by drafting to the bottling tables, the ball L' will gradually fall by its own weight combined with that of the valve and its connections, drawing down the valve and opening the passage to admit liquid to replace that drawn off.

The tubular spindle $m^2$ is provided with a series of holes $b^2$ so located that when the valve is closed, one or more of said holes will be above the screw cap $c^2$ which closes the bottom of the valve-casing, and one or more of said holes will be below said cap as shown. These holes $b^2$ by affording drainage, prevent the accumulation in the chamber $p'$ below the valve-plug $q'$, of liquid which may enter from the main portion of the casing, and which, if allowed to remain, would obstruct or prevent the opening of the valve.

The cap $c^2$ through which the tubular spindle $m^2$ passes, is provided on its inner side with a seat $d^2$ upon which fits the lower part of the plug $q'$ when the valve is wide open, said plug being provided with an elastic washer or packing $e^2$, thereby making a tight joint at the seat $d^2$ and preventing the escape of liquid around the tubular spindle $m^2$, whereby all the liquid admitted at the inlet $h'$ is compelled to pass through the outlet $i'$ to the stand pipe and spraying device connected therewith.

The lower portion of the tube $k'$ extends down into the bottom part of the ball L', as previously described, and the upper portion of the said tube immediately below the coupling plug $l'$ is provided with a vent hole $f^2$ through which gas under pressure when admitted to the cylinder or vessel in which the float-valve is placed, is allowed free ingress and egress to and from the hollow ball, thus preventing it from being burst or collapsed by the pressure of said gas from within or without. This vent hole $f^2$ is preferably provided with a short tube $g^2$ bent downward at it outer end to prevent, as far as possible, liquid falling within the mixing cylinder or dropping from the valve-casing, from entering the float-ball through the tube $k'$. The tube $k'$ and its vent hole also perform the same additional duty as the tube $e$ shown in Fig. 7, in case of liquid being carried with the gas into the interior of the ball. Liquid so carried into the ball L' will of course accumulate in its lower portion, submerging the lower end of the tube $k'$, and whenever the pressure in the mixing-cylinder or vessel is reduced by draft to the bottling tables or otherwise, the gas in the ball will expand and escape through the tube $k'$ and its vent, driving out the liquid before it in the same manner as in the float ball—shown in Fig. 7.

The operation of the parts is as follows: All the valves being closed except the relief-valve T, gas, at a higher pressure than that required in the finished soda-water, is taken from the generator or other source of supply and conducted by a pipe which is attached to the apparatus at the gas-inlet $d$. The valve M below the gas inlet is then opened to admit gas to the primary mixing-cylinder I through the pipe L, after which the regulating valve N is opened gradually until the pressure gage $h$ of the cylinder I indicates ten pounds above the pressure desired in the finished soda-water, say seventy pounds, which pressure, during the subsequent operation of the parts, will be maintained in that cylinder by the automatic action of the regulating valve N. The valve P above the gas-inlet $d$ is next opened to admit gas to the secondary cylinder K, after which the regulating valve Q is gradually opened until the pressure gage $h$ above said cylinder K indicates the pressure desired in the finished soda-water, say sixty pounds, which pressure will thereafter be maintained in the secondary cylinder K by the action of the regulating valve Q. The two valves P and M above and below the gas-inlet $d$ are now closed and the air or safety valves $i$ opened and fifteen pounds pressure blown off from each cylinder, this operation driving out the atmospheric air, which, being lighter than the carbonic-acid gas, has risen into the tops or domes of the cylinders. When the pressure gages $h$ on the domes of the cylinders show fifteen pounds less than the initial pressure in each, the safety valves $i$ are closed and the gas-inlet valves P and M again opened, when the gas from the generator will pass through the regulating valves N and Q in sufficient quantity to replace the initial pressures of seventy and sixty pounds respectively in the cylinders I and K, said valves then remaining open and maintaining the said pressures of seventy and sixty pounds respectively in the said cylinders I and K. Water or other liquid is then supplied to the apparatus by a suction pipe connected at the water-inlet $k$, and the pump C set in action by shipping the belt onto the fast pulley G. The pump now drafts the water or other liquid from the tank, which liquid having no outlet, creates pressure in the pipe $m$, opens the relief-valve T, and escapes back into the tank from which it was drawn through the pipe $p$, Fig. 2. The relief-valve T is now set by screwing in its spindle until the pressure gage $m'$ on the air chamber S indicates thirty or forty pounds greater pressure than that in the primary cylinder I, say one hundred pounds. After the relief-valve T has been set to the required pressure, the inlet valve R of the cylinder I is opened, when the relief-valve T will instantly close and the pump commence to deliver water into the cylinder I which is discharged, as before described, in a fine spray or shower through the spraying device C', the liquid being soon visible in the water-gage glass $q$. As soon as the water in the cylinder I reaches the desired level, the floating ball D' is raised thereby, closing the valve $w$ and shutting off the supply of water from the pump. The relief valve T then immediately opens by reason of the increased pressure, and the water then forced by the pump is returned to the tank from which it was drawn as it can no longer enter the cylinder I. As the water enters the cylinder I through the spraying device, the pressure slowly increases by reason of the further compression of the gas by the entrance of the water, and the safety valve should be set to blow off at eighty pounds. The valve 30 in the pipe W located at the bottom of the cylinder I is now opened, whereupon the eighty pounds pressure contained in the said cylinder I drives the liquid therein partially impregnated with gas through the pipe W into the secondary cylinder K, the pressure in which is but sixty pounds, where it is forced through the spraying device of said cylinder, falling to the bottom thereof, and becoming thoroughly saturated or impregnated by contact with the gas under pressure therein. As the water rises in the cylinder K its level will be indicated in the glass water-gage $q$, and when the desired height is reached, the floating ball $b'$ will close the valve $a'$, thus shutting off the supply of liquid partially impregnated with gas which is being delivered by the pipe W. While the water is passing into the secondary cylinder K, the pressure gradually increases therein, and its safety valve $i$ should be set to maintain the pressure at seventy pounds. Meanwhile, as the liquid passes from the primary cylinder I into the secondary cylinder K, the floating ball D' in the cylinder I falls, opening its valve $w$ and admitting more water from the pump C to replace that withdrawn, whereupon the relief-valve T promptly closes and remains closed until the water in the cylinder I has again reached the height at which the ball-valve $w$ closes, when the relief-valve T again opens as before. By spraying the water or other liquid twice in the carbonic-acid gas under high pressure and dropping it in a finely divided condition from a considerable height, say three feet or more, the water is compelled to rapidly absorb as much gas as it is capable of at the pressure and temperature employed. The apparatus now containing a supply of highly charged soda-water, bottling may be commenced by drawing off the liquid through the distributing device H', by which the liquid is supplied to the bottling tables as before described. After this the action of the apparatus is entirely automatic as long as gas is supplied at a pressure exceeding seventy pounds, and water or other liquid is likewise supplied in sufficient quantity for the needs of the bottler or bottlers, and the apparatus requires no further attention. It will thus be seen that the regulating valves govern the pressure of the gas supplied, the ball valves govern the quantity of water delivered to the mixing cylinders, the relief-valve T protects the pump from strain and disposes of the surplus liquid without wasting it, while the air or safety valves serve as vents to dispose of atmospheric air.

The apparatus may be constructed to supply a number of bottling tables, and such apparatus may be used to supply economically a single table if desired, the construction of the apparatus being such that only sufficient carbonated liquid is manufactured to supply the table or tables drawing liquid therefrom. It will furnish liquid at a hundred and eighty pounds pressure for filling siphon-bottles or portable fountains as readily as at sixty pounds for ordinary bottling, and while it is especially well adapted for bottling fine table waters, it is equally well suited to the work of an ordinary bottling shop. By thus employing a pump for pumping liquid only into the mixing-vessel and causing the gas to enter said vessel by its own pressure, instead of using a pump for pumping liquid and gas combined, better results are produced, as the pump works to better advantage, more liquid is delivered at each stroke, and the liquid caused to absorb a greater quantity of gas in a shorter period of time, which is of great importance in machines of this description.

What we claim as our invention, and desire to secure by Letters Patent, is—

1. The continuous method of carbonating liquids which consists in charging two closed mixing tanks, a primary and an auxiliary, with gas direct from the generator or flask, automatically maintaining the pressure in said tanks, one being charged at a lower pressure than the other, forcing liquid into the primary mixing tank under a greater pressure than the gas therein, automatically controlling the supply of liquid to said primary tank, and finally forcing the carbonated liquid from the primary to the auxiliary tank by means of the excess of pressure in the former and automatically controlling such supply to the auxiliary vessel by the rise of the liquid therein, substantially as herein described.

2. A carbonating apparatus comprising a closed mixing tank, a pipe leading to said tank for supplying it with gas direct from the generator or flask, an automatic pressure regulating valve in said pipe to admit more gas when the pressure in the tank falls a certain amount and to maintain such pressure, a liquid supply pipe separate and independent from the gas pipe and its valve, and a pump for forcing liquid alone through the liquid supply pipe into the mixing tank at a higher pressure than the gas, the said pipe being provided with a float valve within the tank and a relief valve exterior to the tank substantially as herein described.

3. A carbonating apparatus comprising a closed mixing tank, a pipe leading to said tank for supplying it with gas direct from the generator or flask and an automatic pressure regulating valve in said pipe to admit gas to the tank when the pressure falls a certain amount and to maintain such pressure, a liquid supply pipe separate and independent from the gas pipe and its regulating valve, a float valve for the liquid pipe in the said tank and an automatically controlled outlet pipe for conducting the carbonated liquid from the said mixing tank, substantially as herein described.

4. The combination with the primary and auxiliary mixing tanks each having a pipe to supply it with gas direct from the generator or flask, an automatic pressure regulating valve in each of said pipes to admit more gas upon the reduction of pressure in either tank and to maintain the said pressure; the pressure in the auxiliary tank being less than in the primary tank, a liquid supply pipe leading from a pump to the primary mixing tank and wholly independent of the gas supply pipes and their valves, a float valve in the primary tank for controlling the rise of the fluid therein, a pipe connecting the said two tanks and provided within the auxiliary tank with a float valve operated by the rise of the carbonated liquid in said tank, and a valved outlet for the liquid in the auxiliary tank, substantially as herein described.

5. In a machine for making carbonated beverages, the combination of a primary mixing-vessel, a gas supply pipe connected therewith and adapted to supply gas alone by its own pressure without the employment of a gas-pump, a pump for pumping liquid only, said pump connected with said mixing-vessel by a suitable conducting pipe, a spraying device arranged within the upper portion of the primary mixing vessel and connected with the liquid conducting pipe, whereby the liquid is sprayed within said primary mixing vessel containing gas under pressure, a secondary mixing-vessel connected with the gas-inlet by a suitable pipe and adapted to contain gas under a pressure less than that in the primary mixing-vessel, a pipe connecting the primary mixing-vessel with the secondary mixing-vessel, said pipe being connected with a spraying device arranged within the upper portion of said secondary mixing vessel, whereby the partially carbonated liquid is forced by the pressure of the gas in the primary mixing-vessel into and sprayed within said secondary mixing-vessel to complete the carbonating of the liquid, and suitable automatic regulating valves, whereby a different pressure of gas may be simultaneously maintained in each of the mixing vessels, substantially as described.

6. In a machine for making carbonated beverages, the combination of a primary mixing-vessel, a gas supply-pipe connected therewith and adapted to supply gas alone by its own pressure without the employment of a gas-pump, a pump for pumping liquid only, said pump connected with said mixing-vessel by a suitable conducting pipe, a spraying device arranged within the upper portion of the primary mixing-vessel and connected with the liquid conducting pipe, whereby the liquid is sprayed within said primary mixing-vessel containing gas under pressure, a secondary mixing-vessel connected with the gas-inlet by a suitable pipe and adapted to contain gas under a pressure less than that in the primary mixing-vessel, a pipe connecting the primary mixing-vessel with the secondary mixing-vessel, said pipe being connected with a spraying device arranged within the upper portion of said secondary mixing vessel, whereby the partially carbonated liquid is forced by the pressure of the gas in the primary mixing-vessel into and sprayed within said secondary mixing-vessel to complete the carbonating of the liquid, suitable automatic regulating valves whereby a different pressure of gas may be simultaneously maintained in each of the mixing-vessels, float-valves arranged within the mixing-vessels and adapted to shut off the supply of liquid thereto when it has reached the desired level, and a relief-valve applied to the liquid conducting pipe between the pump and the primary mixing-vessel, all operating substantially in the manner and for the purpose set forth.

7. In a machine for making carbonated beverages, the combination of the two mixing-vessels I, K, the connecting pipe W, the gas supply pipes L, $f$, provided with automatic regulating valves N, Q, for maintaining different pressures in said mixing-vessels, the liquid pump C, the conducting pipe $m$ leading therefrom to the primary mixing-vessel I, and provided with a relief-valve T, the spraying devices C', G', arranged within the said mixing-vessels and connected, the former with the liquid pipe $m$, and the latter with the pipe W, and the floating ball-valves $w$, $a'$, arranged within the mixing-vessels I, K, and adapted to control the supply of liquid thereto, all arranged for operation substantially as herein shown and described.

8. The combination, with a vessel adapted to contain liquid and gas under pressure, of a float-valve located within said vessel and having its hollow float-ball provided with a vent tube through which the gas is permitted to enter and escape to equalize the pressure on the inside and outside of said ball, said tube extending down into the bottom portion of the ball and having its upper end provided with means for preventing the entrance therein of liquid, substantially as set forth.

9. The combination, with a vessel adapted to contain liquid and gas under pressure, of a float-valve located within said vessel and having its hollow float-ball provided with a vent tube $e$ open at both ends and extending down into the bottom portion of the ball, and having its upper end outside of said ball crooked or bent over to point downward, substantially as and for the purpose described.

10. The combination, with a vessel adapted to contain liquid and gas under pressure, of a float valve consisting of a casing having a lower valve chamber, a valve plug adapted to move vertically in said chamber and provided with a vertical tubular stem or spindle having drainage openings adapted to permit the escape of liquid from the valve chamber when said valve is closed, and a float-ball connected with said valve stem or spindle and adapted to close and open said valve as it rises and falls, substantially as described.

11. The combination, with a vessel adapted to contain liquid and gas under pressure, of a float-valve consisting of a casing having a lower valve chamber, a valve-plug adapted to move vertically in said chamber, and provided with a vertical tubular stem or spindle having drainage openings $b^2$ adapted to permit the escape of liquid from the valve chamber when said valve is closed, a float-ball connected with said valve stem or spindle and adapted to close and open said valve as it rises and falls, and valve-seats above and below said valve-plug, with which it co-operates, all constructed to operate substantially in the manner and for the purpose set forth.

12. The combination, with a vessel adapted to contain liquid and gas under pressure, of a float-valve comprising a casing K' having an upper valve-seat $r'$ and a vent aperture $a^2$ extending from a point above said valve-seat into the outlet passage $i'$, a valve chamber $p'$, the latter provided with a valve seat $d^2$, a valve plug $q'$ adapted to move vertically within the chamber $p'$ and co-operate with the valve-seats $r'$ and $d^2$, said valve-plug having a vertical tubular valve-stem or spindle provided with drainage openings $b^2$, adapted to permit the escape of liquid from the valve chamber when the valve is closed, and a float-ball $L'$ connected with the valve-stem or spindle, all operating substantially as described and for the purpose specified.

Witness our hands this 6th day of February, A. D. 1893.

JOHN MACKSEY,
WILLIAM HELMER.

In presence of—
P. E. TESCHEMACHER,
FRANK T. McHUGH.